United States Patent
Burek et al.

(10) Patent No.: US 10,534,151 B2
(45) Date of Patent: Jan. 14, 2020

(54) SYSTEMS AND TECHNIQUES FOR SPLICING TOGETHER OPTICAL FIBER RIBBON CABLES HAVING DIFFERENT CORE-TO-CORE SPACINGS

(71) Applicant: OFS Fitel, LLC, Norcross, GA (US)

(72) Inventors: Denis E. Burek, Cumming, GA (US); Wladyslaw Czosnowski, Duluth, GA (US); Yue Liang, Peachtree City, GA (US)

(73) Assignee: OFS FITEL, LLC, Norcross, GA (US)

( * ) Notice: Subject to any disclaimer, the term of this patent is extended or adjusted under 35 U.S.C. 154(b) by 253 days.

(21) Appl. No.: 15/802,807

(22) Filed: Nov. 3, 2017

(65) Prior Publication Data
US 2019/0137711 A1 May 9, 2019

(51) Int. Cl.
| | |
|---|---|
| G02B 6/44 | (2006.01) |
| G02B 6/25 | (2006.01) |
| B29D 11/00 | (2006.01) |
| G02B 6/255 | (2006.01) |
| G02B 6/02 | (2006.01) |

(52) U.S. Cl.
CPC .......... *G02B 6/448* (2013.01); *B29D 11/0075* (2013.01); *G02B 6/02033* (2013.01); *G02B 6/25* (2013.01); *G02B 6/255* (2013.01)

(58) Field of Classification Search
CPC ................ B29D 11/0075; G02B 6/448; G02B 6/02033; G02B 6/255; G02B 6/25
See application file for complete search history.

(56) References Cited

U.S. PATENT DOCUMENTS

| | | | |
|---|---|---|---|
| 2004/0036188 A1* | 2/2004 | Arboix | G02B 6/2558 264/1.27 |
| 2014/0064665 A1* | 3/2014 | Ott | G02B 6/3821 385/60 |

* cited by examiner

*Primary Examiner* — Mathieu D Vargot
(74) *Attorney, Agent, or Firm* — Daniel Kim, Esq.; Jacobs & Kim LLP (57) ABSTRACT

A system forms, at an end of a multifiber ribbon cable, a multifiber ribbon cable segment having an enlarged core-to-core spacing. A UV-transparent mold is mounted on top of a chassis. The mold defines a plurality of individual fiber channels corresponding to individual fibers of the existing multifiber ribbon cable and having a spacing equal to that of the enlarged core-to-core spacing. Each individual fiber channel passes through the internal cavity. The assembled mold further includes an injection system for receiving light curable, flowable material from the reservoir and pumping system and feeding it into the internal cavity, and at least one vent for allowing air to escape from the internal cavity as the light-curable, flowable material is fed into the internal cavity. The injected material is cured by exposure to a curing light.

7 Claims, 9 Drawing Sheets

SYSTEMS AND TECHNIQUES FOR SPLICING TOGETHER OPTICAL FIBER RIBBON CABLES HAVING DIFFERENT CORE-TO-CORE SPACINGS

BACKGROUND OF THE INVENTION

Field of the Invention

The present invention relates generally to the field of fiber optics, and in particular to an improved systems and techniques for splicing together optical fiber ribbon cables having different core-to-core spacings.

Background Art

A newly designed optical fiber ribbon cable has been introduced, in which the individual optical fibers within the ribbon have a core-to-core spacing of 200 μm, compared with earlier ribbon designs having a core-to-core spacing of 250 μm. The new design increases the cable density and improves the cable capacity to meet the fast-growing construction demands of data centers and Web 2.0-type networks.

In a common application, 200 μm-spaced, 12-fiber ribbons are mass fusion-spliced by craft personnel in the field. There are times when a 200 μm ribbon must be spliced to a 250 μm ribbon. There are currently no mass fusion splicers capable of a making a splice between a 200 μm ribbon and to a 250 μm ribbon.

SUMMARY OF INVENTION

These and other issues are addressed by aspects of the present invention, aspects of which are directed to a system for forming, at an end of an existing multifiber ribbon cable having an initial core-to-core spacing, a multifiber ribbon cable segment having an enlarged core-to-core spacing. A mold is mounted on top of a chassis. A reservoir and pumping system are mounted on top of the mold for holding a flowable, light-curable material and injecting the light-curable material into the mold. A curing light source is mounted into an enclosure within the chassis. The mold is formed from a material that is transparent to the curing light and is positioned such that light-curable material injected into the mold is exposed to light from the curing light source. The mold comprises a base and a lid that, when in a closed configuration, define an internal cavity corresponding to the multifiber ribbon cable segment to be formed, and further define a plurality of individual fiber channels corresponding to individual fibers of the existing multifiber ribbon cable and having a spacing equal to that of the enlarged core-to-core spacing. Each individual fiber channel passes through the internal cavity, and extends between a respective entrance at a first end of the mold to a respective exit at a second end of the mold. The assembled mold further includes an injection system for receiving light curable, flowable material from the reservoir and pumping system and feeding it into the internal cavity, and at least one vent for allowing air to escape from the internal cavity as the light-curable, flowable material is fed into the internal cavity.

Further aspects of the invention are described below.

DETAILED DESCRIPTION

Aspects of the present invention are directed to systems and techniques for splicing a 200 μm-spaced fiber ribbon to a 250 μm-spaced fiber ribbon. It will be appreciated from the following discussion that aspects of the invention can be adapted for use in other contexts, including for example ribbons having different numbers of fibers, different configurations, and different core-to-core spacings.

Figure 1A:
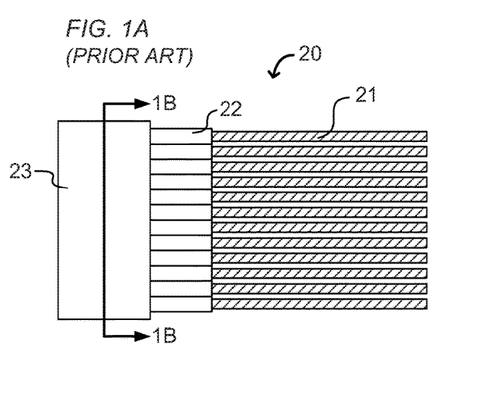
FIG. 1A shows a top view of an exemplary 200 μm optical fiber ribbon according to the prior art.
Figure 1B:
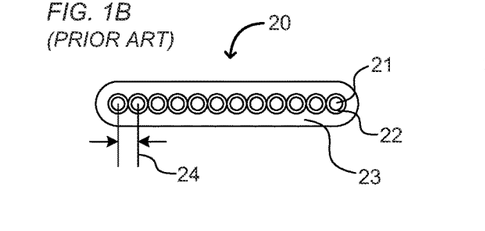
FIG. 1B shows a cross section of the fiber ribbon through the plane 1B-1B.
Figure 2A:
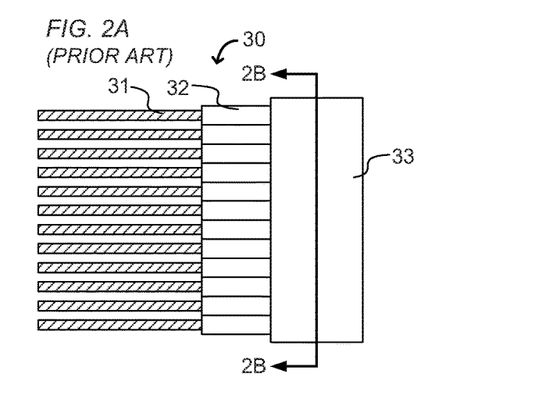
FIG. 2A shows a top view of an exemplary 250 μm optical fiber ribbon according to the prior art.
Figure 2B:
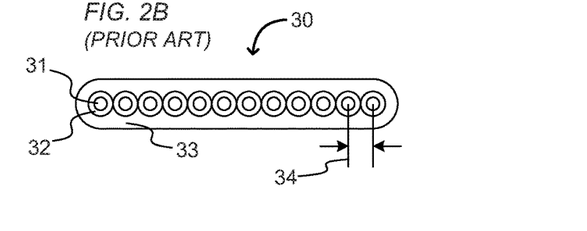
FIG. 2B shows a cross section of the fiber ribbon through the plane 2B-2B.

FIG. 1A shows a top view of an exemplary 200 μm fiber ribbon 20 according to the prior art, and FIG. 1B shows a cross section of the 200 μm fiber ribbon 20 through the plane 1B-1B. FIG. 2A shows a top view of an exemplary 250 μm fiber ribbon 30 according to the prior art, and FIG. 2B shows a cross section of the 250 μm fiber ribbon 30 through the plane 2B-2B.

As discussed above, the splicing of a 200 μm fiber ribbon to a 250 μm fiber ribbon is problematic because of the mismatch between the respective core-to-core spacings of the individual fibers packaged into each ribbon.

As shown in FIGS. 1A-1B and 2A-2B, each fiber ribbon 20, 30 comprises a 1×12 array of individual optical fibers 21, 31 each of which having a respective coating 22, 32. In the ribbon 20 shown in FIGS. 1A-1B, the individual optical fibers have a core-to-core spacing 24 of 200 μm. In the ribbon 30 shown in FIGS. 2A-2B, the individual optical fibers have a core-to-core spacing 34 of 250 μm. Each array of coated fibers is depicted as being packaged inside of an outer jacket 23, 33 (i.e., in an encapsulated ribbon design). It is noted that the invention may be practiced in other contexts including, for example, splicing together fiber ribbons employing an edge-bonded design.

As mentioned above, the spacing mismatch means that a mass fusion splicer according to the prior art cannot be used to splice the two ribbons together. Aspects of the present invention are directed to structures and techniques for modifying the core-to-core spacing of the fibers in a first ribbon to match the core-to-core spacing of the fibers in a second ribbon.

Figure 3:
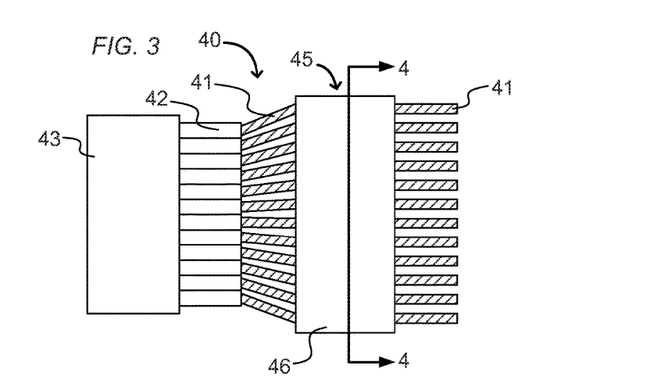
FIG. 3 shows a top view of an exemplary 200 μm fiber ribbon, in which the fiber-to-fiber spacing has been modified in accordance with an aspect of the invention.
Figure 4:
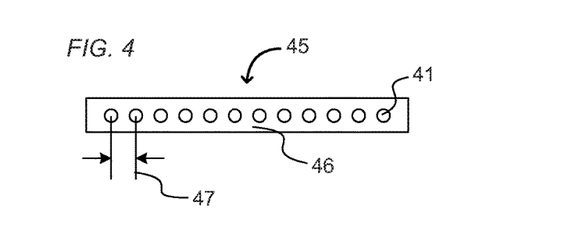
FIG. 4 shows a cross section of the modified fiber ribbon through the plane 4-4.

FIG. 3 shows a top view of a 200 μm fiber ribbon 40 that has been modified in accordance with an exemplary practice of a technique according to the present invention for splicing the 200 μm fiber ribbon 40 to a second fiber ribbon having a core-to-core spacing of 250 μm. FIG. 4 shows a cross section of the modified fiber ribbon 40 through the plane 4-4.

As described in detail below, a system is provided for use in the field, or in other contexts, that forms at least one molded strip 46 around the individual stripped fibers 41 at the end of the 200 μm ribbon to form a new ribbon segment 45 having a core-to-core spacing 47 of 250 μm, thereby allowing a standard mass fusion splicer to be used.

Figure 5:
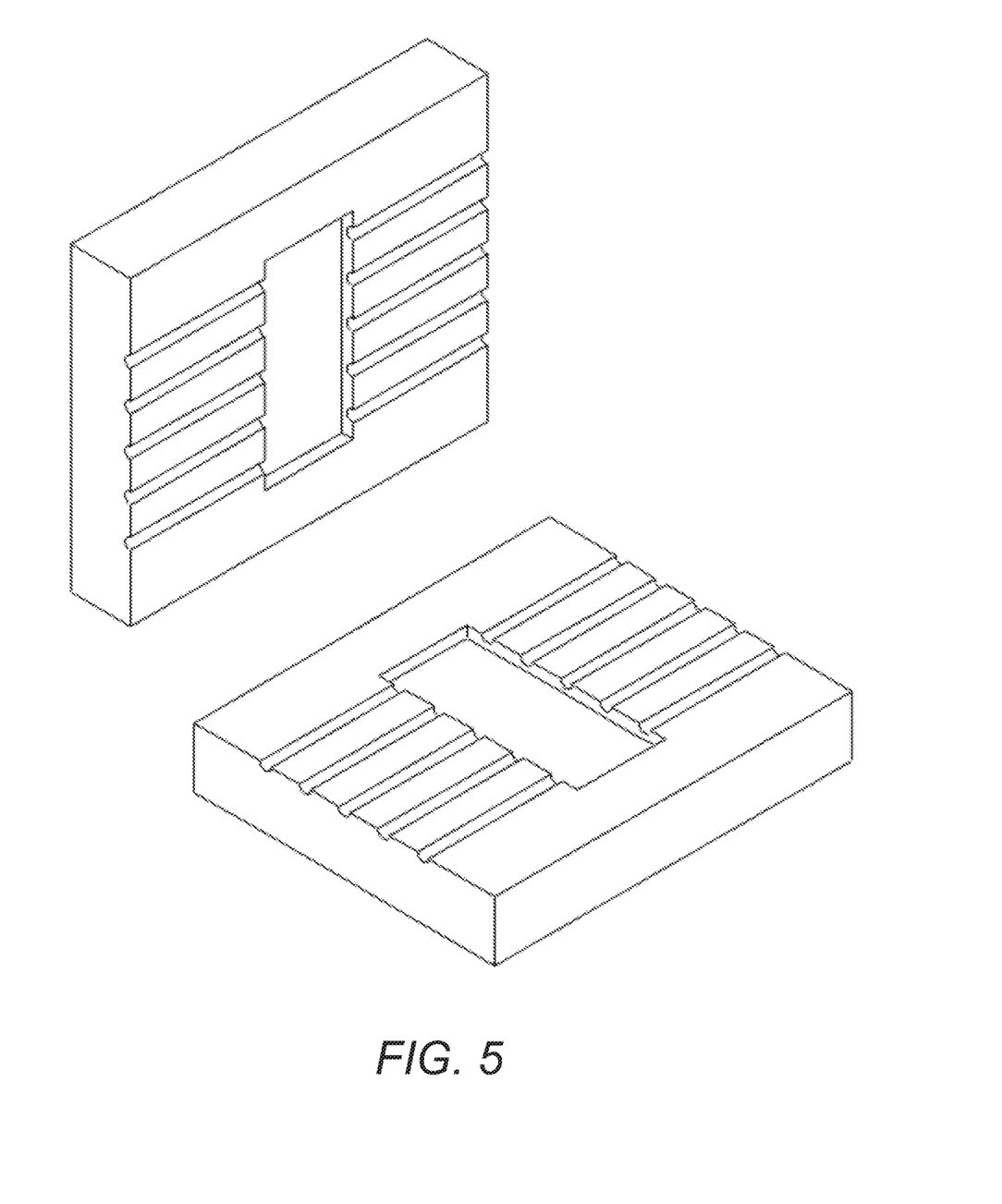
FIG. 5 shows an isometric view of unassembled lower and upper portions of a mold according to an aspect of the invention.
Figure 6:
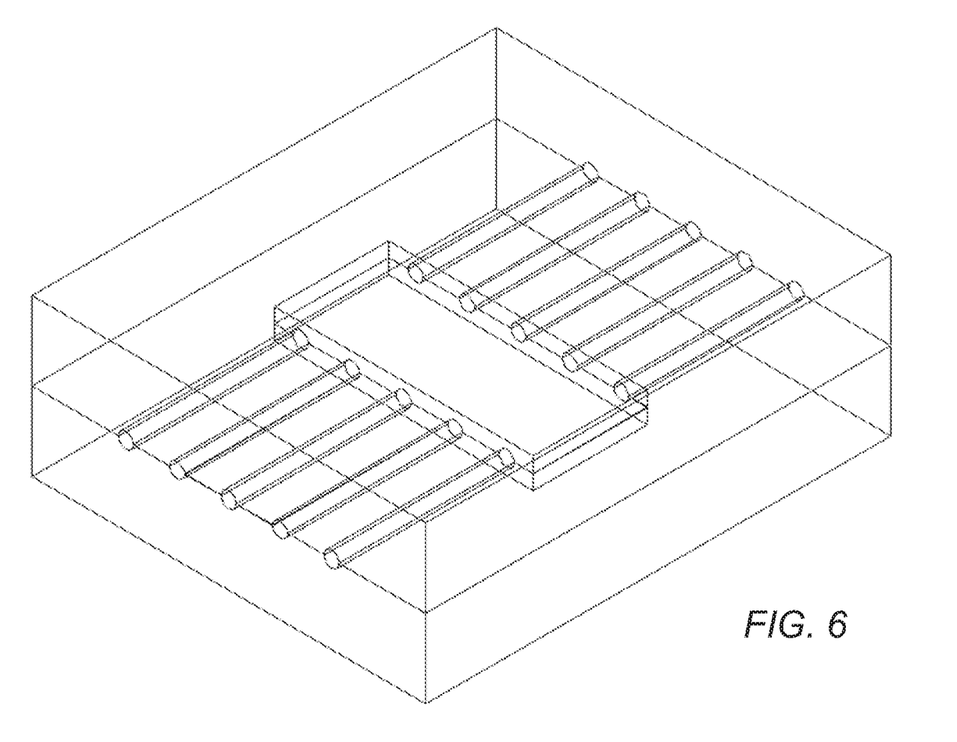
FIG. 6 shows a wireframe isometric view of the mold shown in FIG. 5 in its assembled configuration.

FIG. 5 shows an isometric view of an exemplary 5-fiber mold 60 according to an aspect of the invention. The mold 60 comprises a lower portion 61 and a higher portion 62 that are fabricated from a UV-transparent material, such as quartz. FIG. 6 shows a wireframe isometric view of the assembled mold 70, in which the lower portion 61 and upper portion 62 are fitted together at a split line 71.

The lower and upper mold portions 61, 62 are each provided with a respective set of semicircular grooves 611, 621 and a rectangular central cavity 612, 622. When the lower and upper lower portions of the mold are fitted together, the five respective pairs of semicircular grooves 611, 621 form five circular channels 72 that extend from a proximal end 73 of the assembled mold to a distal end 74. Grooves 611 and 621 be formed using a wire-cut technique.

It is noted that alternative practices of the invention may employ grooves 611, 621 having shapes different from the semicircular shape depicted in FIG. 5, resulting in an assembled mold in which the individual fiber channels 72 have non-circular shapes. For example, V-shaped or rectangular grooves can be employed, resulting in channels shaped as a square, or the like, that is suitable for holding each of the individual ribbon fibers.

Returning to FIG. 5, the circular channels 72 are dimensioned to fit closely around a corresponding set of bare optical fibers having an outer diameter of 125 μm. The lower and upper rectangular cavities 612, 622 form a central rectangular chamber 75 having a width and a height slightly larger than the matrix of fibers to be ribbonized, and a length of approximately 0.25 inch. The circular channels and the central chamber are positioned with respect to each other, such that fibers threaded through the circular channels pass through the central chamber without touching its walls.

In an exemplary practice of the invention, after the lower and upper portions of the mold are assembled together, an end of a 5-fiber 200 μm ribbon is separated and stripped to produce five individual, bare fibers. The bare fibers are threaded through respective mold channels 72. A UV-curable resin (i.e., epoxy) is injected into the chamber, and the resin is then cured by a UV light that passes through the UV-transparent mold material. After the epoxy is cured the mold is opened, and the ribbonized fiber removed.

Figure 7:
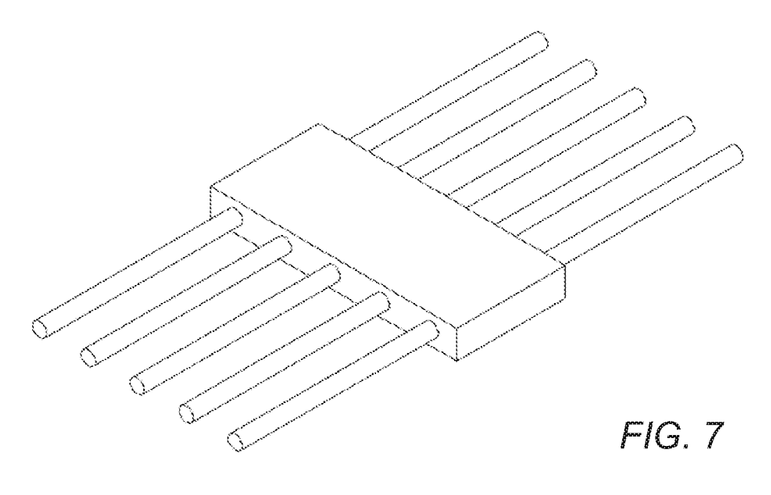
FIG. 7 shows an isometric view of newly formed ribbon segment using the mold shown in FIGS. 5 and 6.

FIG. 7 shows an isometric view of the newly formed ribbon segment 80, wherein a strip has been molded around the matrix of individual fibers 81, resulting in a core-to-core spacing of 250 μm.

Figure 8:
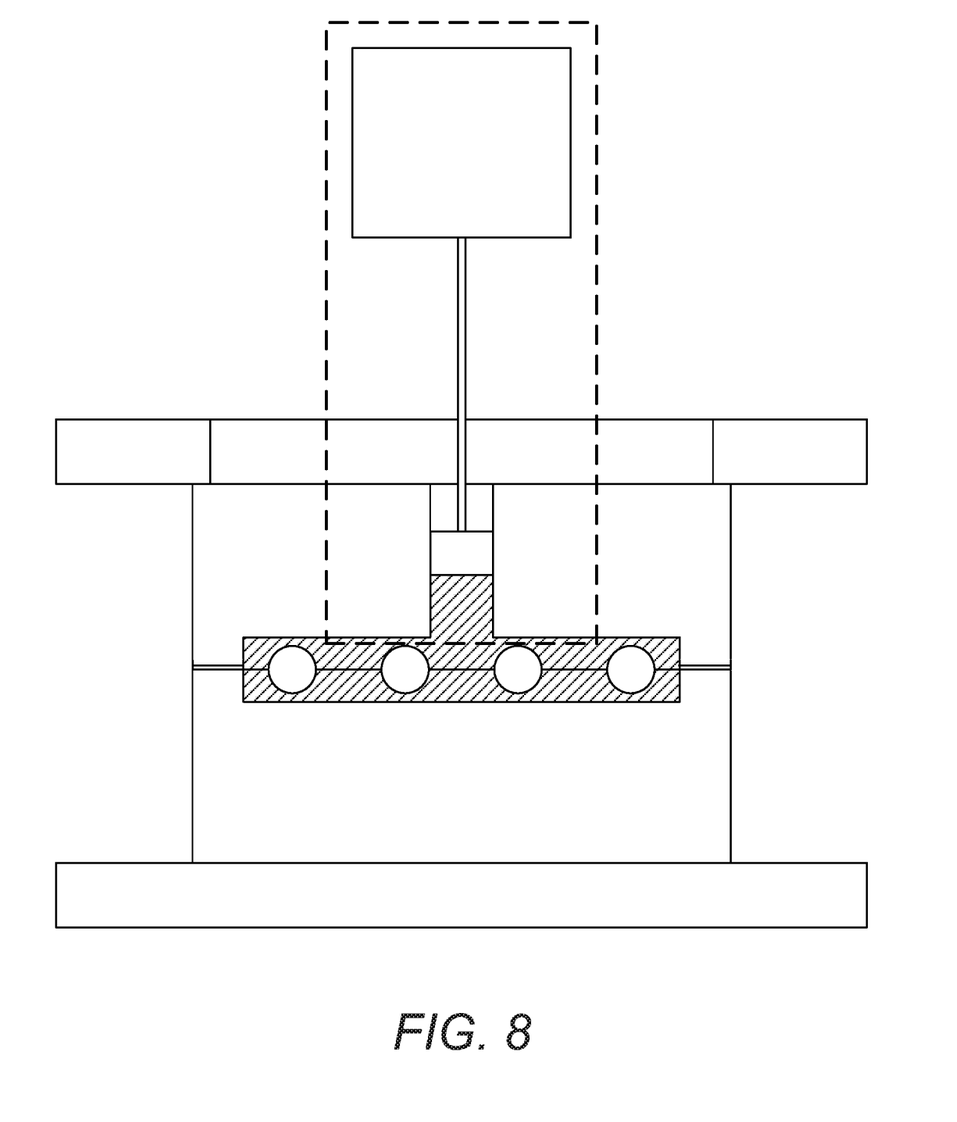
FIG. 8 shows a schematic diagram of a ribbonizing system employing a mold of the type shown in FIGS. 5 and 6.

FIG. 8 shows a schematic diagram of a system 90 incorporating a mold 91 of the type illustrated in FIGS. 5-7.

During the molding process, the mold's lower and upper portions 911, 912 are held together by a suitable holder structure 92, which includes an upper window 921.

System 90 further includes a pusher 933 for injecting a UV-curable resin (e.g., epoxy), or other suitable flowable material 932 from a reservoir 931 into the central chamber. Mold 91 further includes side vents 934 to allow air to escape from the chamber, as resin 932 is injected into the central chamber 915. As mentioned above, mold 91 is fabricated from a material that is transparent to the curing light. Mold 91 further includes a split line 913 that is configured to allow the lower and upper portions of the mold 911, 912 to be separated to release the completed ribbon.

Figure 9:
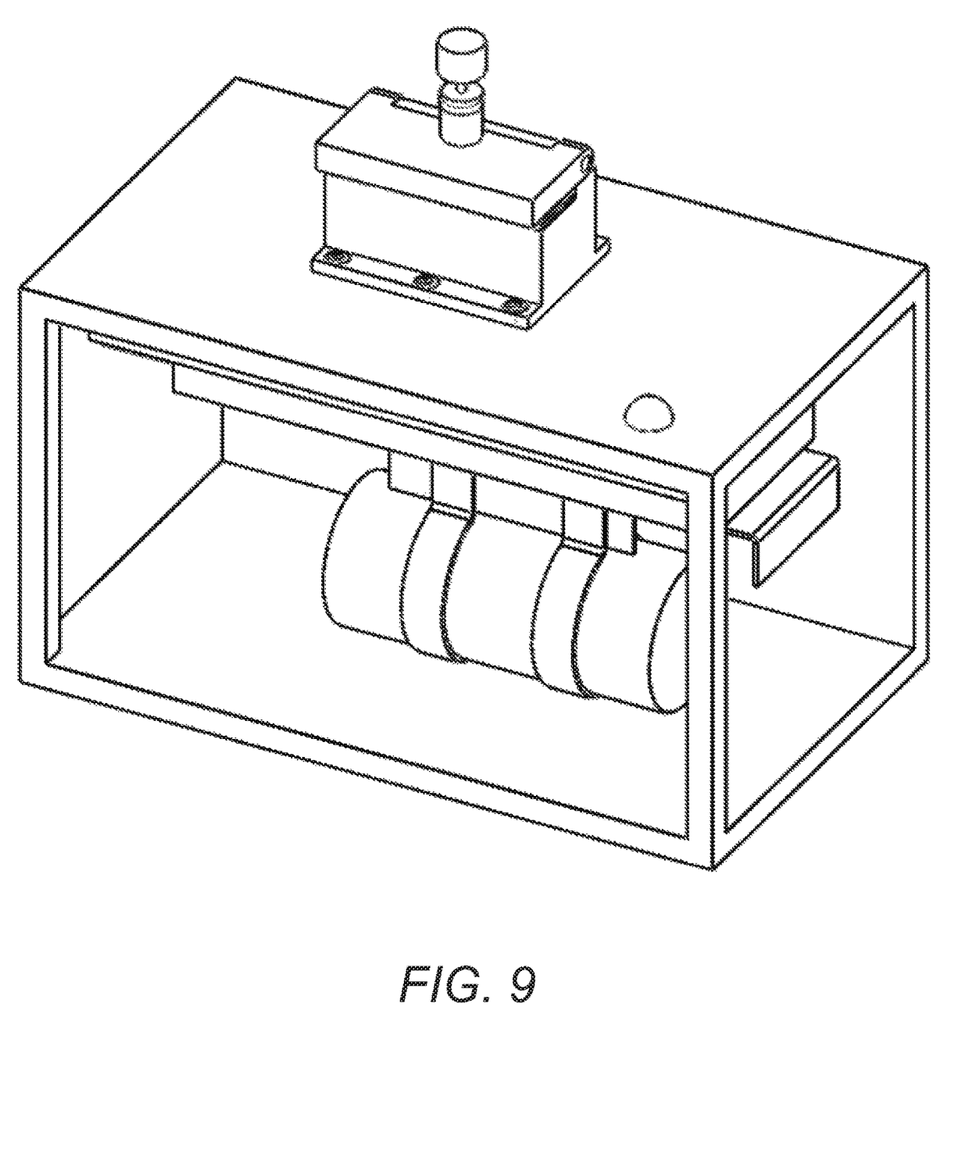
FIG. 9 shows an isometric view of a ribbonizing system according to a further aspect of the invention.

FIG. 9 shows a ribbonizing system 100 according to a further aspect of the invention. The structural framework for system 100 comprises a chassis 110 having an enclosure 111 therein. A molding subassembly 120 is mounted to the top of the chassis. An ultraviolet light unit 140 is mounted into the chassis enclosure 111, and is operated by switch 141.

Figure 10:
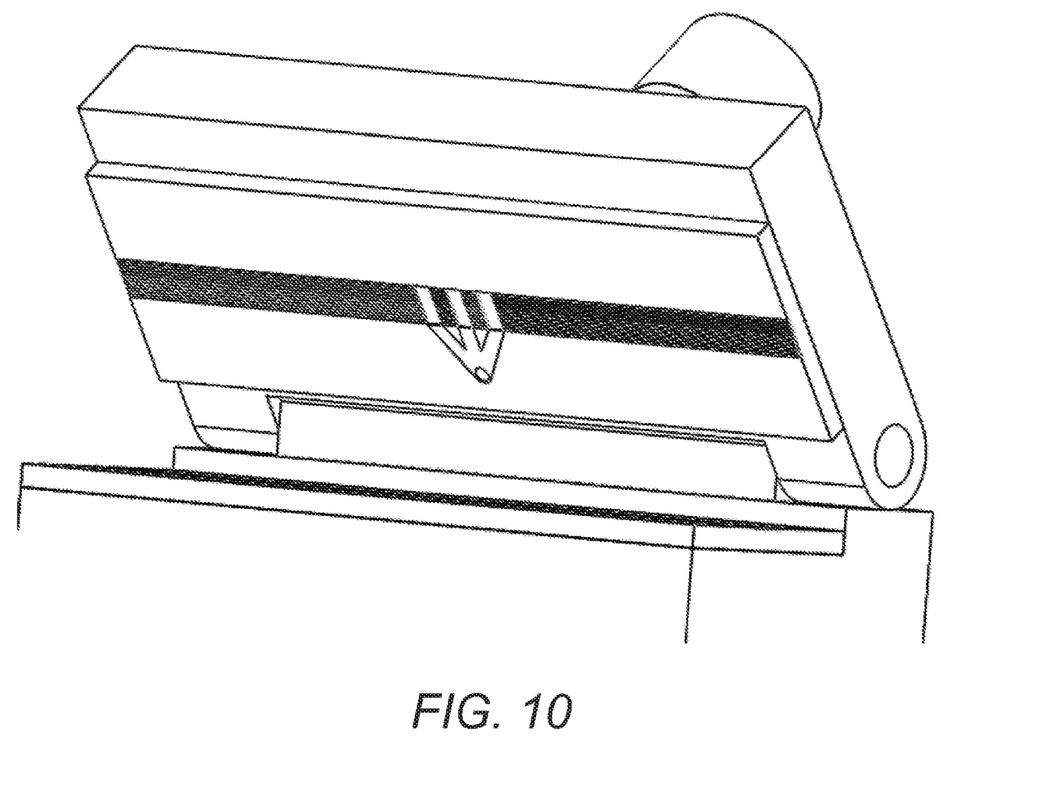
FIG. 10 shows an isometric view of the molding subassembly in the FIG. 9 system, in an open configuration.

The molding subassembly comprises a base 121 and a lid 122 that is hingeably attached on top of the base 121. The lid 122 is configured to swing between a closed position, shown in FIG. 9, and an open position, shown in FIG. 10. As shown in FIG. 10, an epoxy reservoir 130 and pump 131 are mounted to the upper surface of the lid 122.

The molding subassembly 120 further comprises a two-piece mold having a lower portion 151 mounted to the molding subassembly base 121 and an upper portion 152 mounted to the molding subassembly lid 122.

Figure 11:
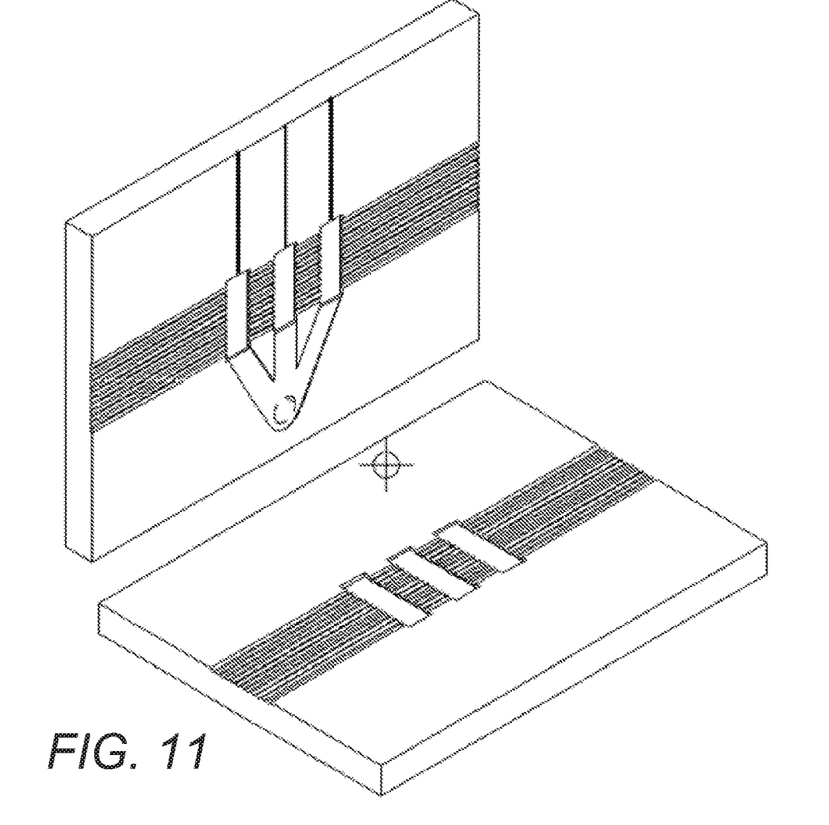
FIG. 11 shows an isometric view of the mold in the FIG. 9 system, in an unassembled configuration.
Figure 12:
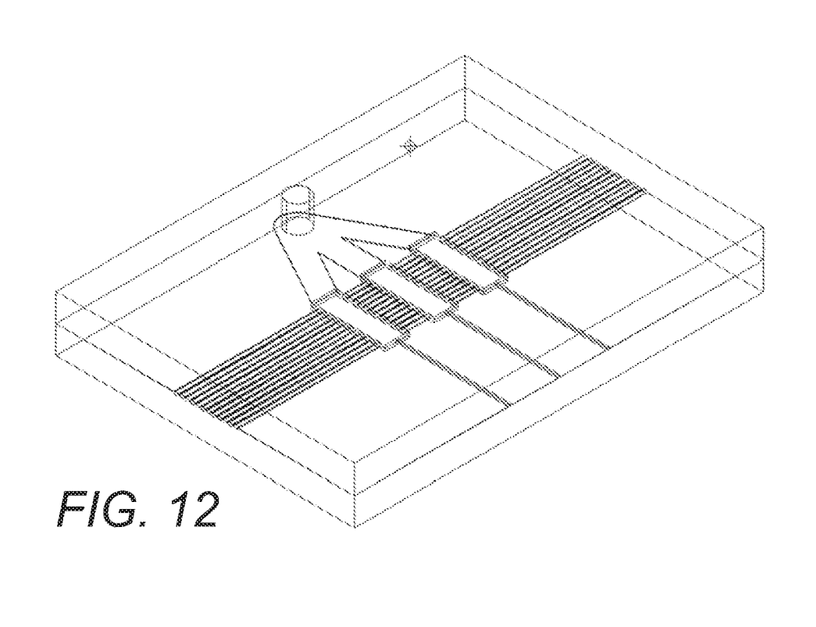
FIG. 12 shows a wireframe isometric view of the FIG. 11 mold, in an assembled configuration.

FIG. 11 shows an isometric view of the lower and upper mold portions 151, 152 in an open, unassembled configuration. FIG. 12 shows a wireframe isometric view of the lower and upper mold portions 151, 152 in a closed configuration.

As shown in FIGS. 11 and 12, the lower and upper portions of the mold 151, 152 include semicircular grooves 1511, 1521 and respective sets of three rectangular cavities 1512, 1522 that fit together to form a plurality of circular channels 162 for receiving a corresponding plurality of optical fibers, and three rectangular chambers 163 for forming three ribbon strips around optical fibers contained in the circular channels. It is noted that the number of rectangular cavities can be greater than or less than the three cavities shown in FIGS. 11 and 12.

The upper portion of the mold is provided with an input port 1523 for receiving epoxy resin from the reservoir 130 (FIG. 9), and three input channels 1524 for feeding epoxy into respective chambers 163. The upper portion of the mold further includes air vents 1525 for allowing air to escape from the chambers as they are filled with injected epoxy.

Figure 13:
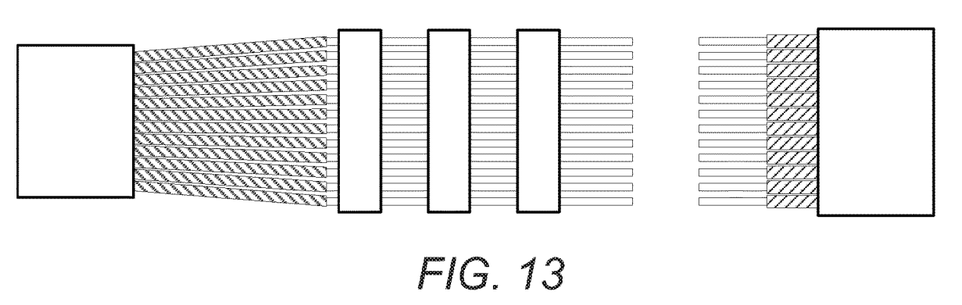
FIG. 13 shows a top view of exemplary first and second fibers to be spliced together, wherein the first fiber has been modified using the FIG. 9 system.

FIG. 13 shows an exemplary 200 μm ribbon that has been ribbonized using the system 100 shown in FIG. 9 in order to allow the 200 μm ribbon to be spliced to an exemplary 250 μm ribbon. In the depicted practice of the invention, three strips are molded around bare individual fibers to form the ribbonized segment 174.

Figure 14:
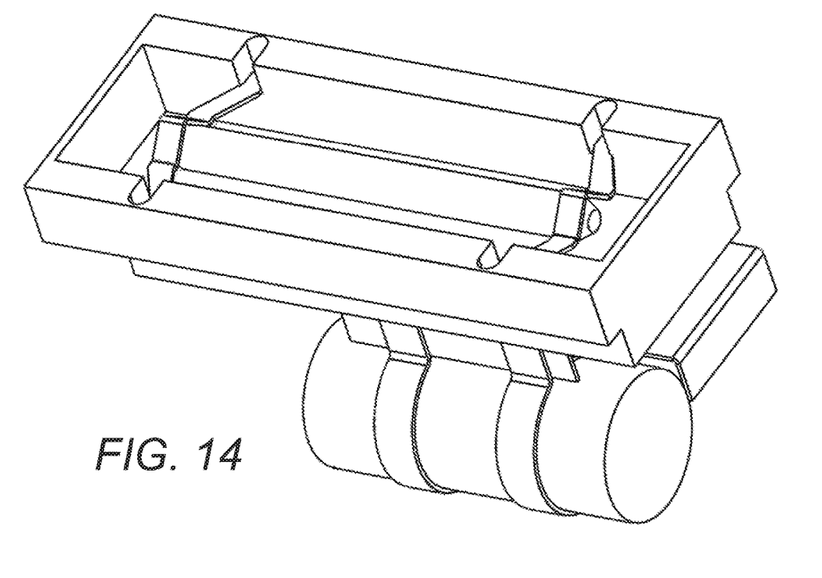
FIG. 14 shows an isometric view of the ultraviolet light unit used in the FIG. 9 system.

FIG. 14 shows an isometric view of ultraviolet light unit 140, mounted into the chassis enclosure 111. The ultraviolet light unit 140 comprises a housing 142, UV lighting element 143, a capacitor 144, and timer circuitry 145.

Figure 15:
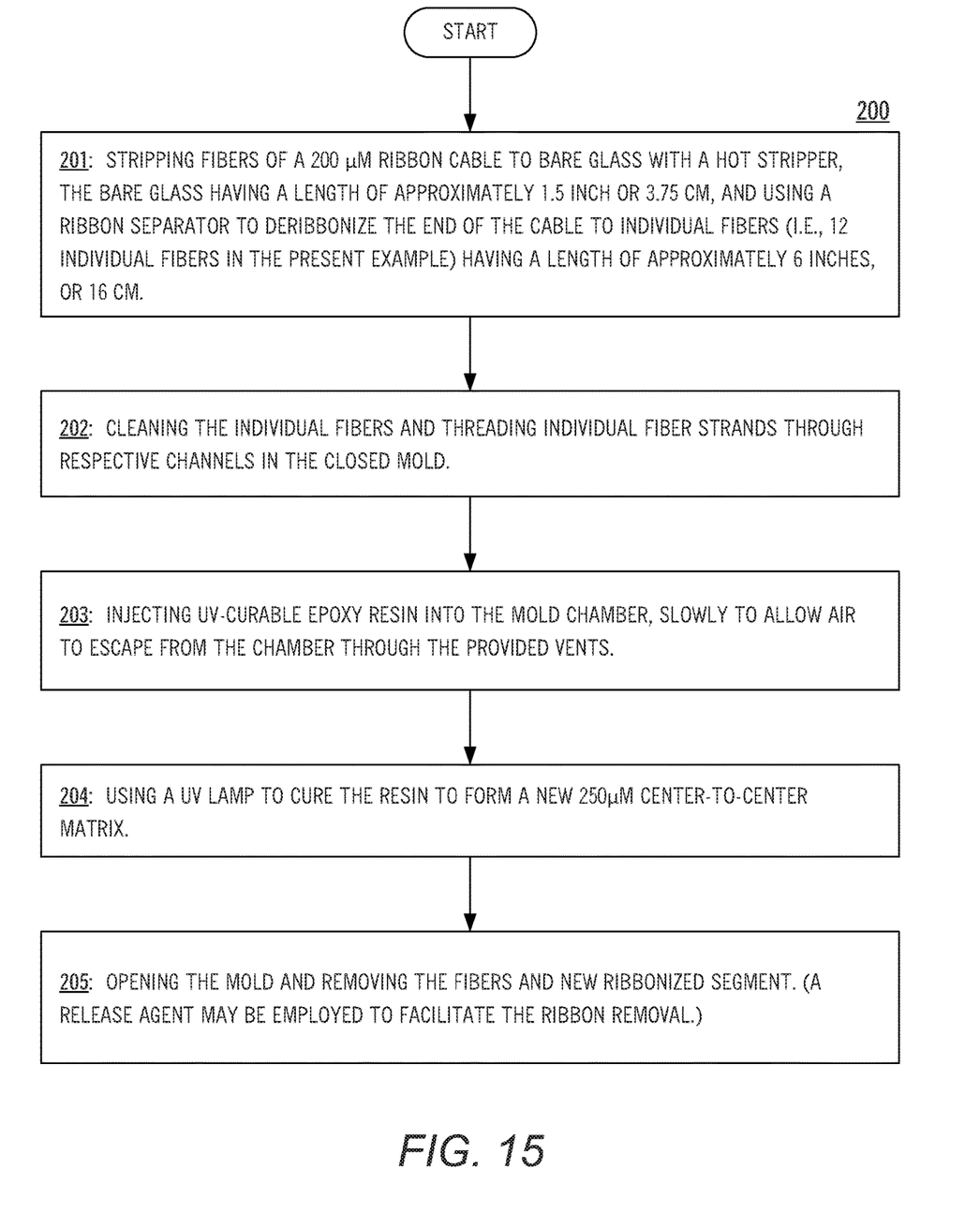
FIG. 15 shows a flowchart of a method according to an aspect of the invention.

FIG. 15 shows a flowchart of a method 200 according to a further aspect of the invention. The method comprises the following steps:

201: Stripping fibers of a 200 μm ribbon cable to bare glass with a hot stripper, the bare glass having a length of approximately 1.5 inch or 3.75 cm, and using a ribbon separator to deribbonize the end of the cable to individual fibers (i.e., 12 individual fibers in the present example) having a length of approximately 6 inches, or 16 cm.

202: Cleaning the individual fibers and threading individual fiber strands through respective channels in the closed mold.

203: Injecting UV-curable epoxy resin into the mold chamber, slowly to allow air to escape from the chamber through provided vents.

204: Using a UV lamp to cure the resin to form a new 250 µm center-to-center matrix.

205: Opening the mold and removing the fibers and new ribbonized segment. (A release agent may be employed to facilitate the ribbon removal.)

CONCLUSION

While the foregoing description includes details that will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. A system for forming, at an end of an existing multifiber ribbon cable having an initial core-to-core spacing, a multifiber ribbon cable segment having an enlarged core-to-core spacing, comprising:
    a chassis,
    a mold mounted on top of the chassis,
    a reservoir and pumping system mounted on top of the mold for holding a flowable, light-curable material and injecting the light-curable material into the mold, and
    a curing light source mounted into an enclosure within the chassis,
    wherein the mold is formed from a material that is transparent to the curing light and is positioned such that light-curable material injected into the mold is exposed to light from the curing light source,
    wherein the mold comprises a base and a lid that, when in a closed configuration, define an internal cavity corresponding to the multifiber ribbon cable segment to be formed, and further define a plurality of individual fiber channels corresponding to individual fibers of the existing multifiber ribbon cable and having a spacing equal to that of the enlarged core-to-core spacing, wherein each individual fiber channel passes through the internal cavity, and extends between a respective entrance at a first end of the mold to a respective exit at a second end of the mold,
    wherein the assembled mold further includes an injection system for receiving light-curable, flowable material from the reservoir and pumping system and feeding it into the internal cavity, and at least one vent for allowing air to escape from the internal cavity as the light-curable, flowable material is fed into the internal cavity.

2. The system of claim 1,
    wherein the flowable, curable material comprises an epoxy resin that is cured by exposure to ultraviolet light, and
    wherein the curing light comprises an ultraviolet light unit with capacitor and timer.

3. The system of claim 2,
    wherein the mold base and lid are fabricated from quartz.

4. The system of claim 1,
    wherein the lid is hingeably mounted to the base and is movable between a closed configuration and an open position,
    wherein the closed configuration is used for insertion of the individual fibers, injection of the flowable material into the cavity, and curing of the flowable material, and removal of the completed ribbon segment.

5. The system of claim 1,
    wherein the mold comprises a plurality of internal cavities, resulting in the formation of a corresponding plurality of new fiber ribbon segments.

6. The system of claim 1,
    wherein the existing multifiber cable has an initial core-to-core spacing of 200 µm, and
    wherein the enlarged core-to-core spacing of 250 µm.

7. A method for forming, at an end of an existing multifiber ribbon cable having an initial core-to-core spacing, a multifiber ribbon cable segment having an enlarged core-to-core spacing, comprising:
    (a) providing a system according to claim 1, and placing the mold into a closed configuration;
    (b) stripping an end portion of an existing multifiber ribbon cable to bare glass, separating the end portion of the existing multifiber ribbon cable into individual fibers, and cleaning them;
    (c) threading the individual fibers through respective channels in the mold;
    (d) inject the curable material into the chamber;
    (e) use the curing light to cure the flowable material; and
    (f) open the mold and remove the ribbonized fiber.

* * * * *